(12) United States Patent
Wang et al.

(10) Patent No.: US 11,458,390 B2
(45) Date of Patent: Oct. 4, 2022

(54) GAME CONTROLLER, AND VIBRATION METHOD AND VIBRATION APPARATUS FOR GAME CONTROLLER

(71) Applicant: AAC Technologies Pte. Ltd., Singapore (SG)

(72) Inventors: Xiuyue Wang, Shenzhen (CN); Jianqi Li, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 37 days.

(21) Appl. No.: 16/994,690

(22) Filed: Aug. 17, 2020

(65) Prior Publication Data

US 2021/0031103 A1 Feb. 4, 2021

Related U.S. Application Data

(63) Continuation of application No. PCT/CN2019/093604, filed on Jun. 28, 2019.

(51) Int. Cl.
*A63F 13/24* (2014.01)
*A63F 13/285* (2014.01)
*G06F 3/01* (2006.01)

(52) U.S. Cl.
CPC .......... *A63F 13/285* (2014.09); *A63F 13/24* (2014.09); *G06F 3/016* (2013.01)

(58) Field of Classification Search
CPC ......... A63F 13/285; A63F 13/24; G06F 3/016
See application file for complete search history.

(56) References Cited

U.S. PATENT DOCUMENTS

| 2006/0046843 | A1* | 3/2006 | Nakajima | A63F 13/285 463/30 |
| 2013/0127759 | A1* | 5/2013 | Bae | G06F 3/016 345/173 |

(Continued)

FOREIGN PATENT DOCUMENTS

| CN | 108089712 A | 5/2018 |
| CN | 108258977 A | 7/2018 |
| CN | 109407832 A | 3/2019 |

OTHER PUBLICATIONS

CN109407832a, Published Mar. 1, 2019, pp. 1-18, ip.com translation PDF, Inventor: Xia Tian, 2019.*

*Primary Examiner* — Omkar A Deodhar
*Assistant Examiner* — Shauna-Kay Hall
(74) *Attorney, Agent, or Firm* — W&G Law Group

(57) ABSTRACT

A game controller, a vibration method and an apparatus for a game controller are provided. In the vibration method, current scene information on a terminal screen is acquired. When the current scene information contains a vibration event, event coordinates are acquired corresponding to the vibration event. A target motor identifier is determined according to the event coordinates. A motor corresponding to the target motor identifier is controlled to vibrate. A terminal device and a computer-readable storage medium are also disclosed. The players can obtain game scene information according to vibration sensations, and make quick and accurate judgments and responses accordingly, so that the game controller not only serves as an input device for game control, but it also serves as an output device for feeding back game information to the players, thus improving the gaming experience for the players.

3 Claims, 4 Drawing Sheets

(56) References Cited

U.S. PATENT DOCUMENTS

| | | | | |
|---|---|---|---|---|
| 2017/0110990 A1* | 4/2017 | Hu | ............................ | H02P 5/74 |
| 2017/0331349 A1* | 11/2017 | Iino | ....................... | H04M 19/04 |
| 2018/0028911 A1* | 2/2018 | Aoki | ....................... | A63F 13/23 |
| 2020/0045184 A1* | 2/2020 | Shen | ................... | H04M 19/047 |

* cited by examiner

GAME CONTROLLER, AND VIBRATION METHOD AND VIBRATION APPARATUS FOR GAME CONTROLLER

CROSS REFERENCE TO RELATED APPLICATIONS

This non-provisional patent application is a continuation application of International Application PCT/CN2019/093604, filed on Jun. 28, 2019, the content of which is incorporated herein by reference.

TECHNICAL FIELD

The present disclosure relates generally to games and, in particular, to a game controller and a vibration method and a vibration apparatus for the game controller.

BACKGROUND

Touch is an important way to gain information about the world, which is different from visual and auditory sensations. In some abstract scenarios without sound and picture, haptic sensation can provide accurate judgment and rich information to users and therefore has great value in application.

Game controllers are a common part for electronic game players, which can be used to control virtual characters in a game by manipulating buttons thereon. However, traditional game controllers can only provide simple control functions for players, but cannot provide direct stimulation from the game, that is, no immersive experience can be provided. As a result, the players often are unable to respond to game pictures timely and accurately, thus affecting the gaming experience.

Combining vibration with the game controllers can realize haptic-based information transmission. However, current game controllers have only a single vibration mode, and its vibration intensity has a fixed value set at factory. During the game, the players can only get a fixed vibration sensation and cannot obtain information in game pictures according to the vibration sensation, which makes the players unable to make an accurate judgment and respond in time, and thus affects the gaming experience for the players.

SUMMARY

Accordingly, embodiments of the present disclosure are directed to a vibration method and a vibration apparatus for a game controller which can address the problem that the current game controllers have only a single function which affects the gaming experience.

In one independent aspect, a vibration method for a game controller includes acquiring current scene information on a terminal screen; when the current scene information contains a vibration event, acquiring event coordinates corresponding to the vibration event; determining a target motor identifier according to the event coordinates; and controlling a motor corresponding to the target motor identifier to vibrate.

In one embodiment, acquiring the event coordinates corresponding to the vibration event includes: extracting all events contained in the current scene information; selecting an event which meets preset trigger conditions from all the events, and determining that the event meeting the preset trigger conditions is the vibration event; and acquiring the event coordinates of the vibration event in a screen coordinates system.

In one embodiment, determining the target motor identifier according to the event coordinates includes: determining a target area of the vibration event in the screen coordinates system according to the event coordinates; and determining a target motor identifier corresponding to the target area according to preset relationships between areas and motor identifiers.

In one embodiment, before controlling the motor corresponding to the target motor identifier to vibrate, the method further includes determining a motor vibration intensity according to the event coordinates. Controlling the motor corresponding to the target motor identifier to vibrate includes controlling the motor corresponding to the target motor identifier to vibrate with the determined motor vibration intensity.

In one embodiment, determining a motor vibration intensity according to the event coordinates includes: obtaining a maximum vibration intensity of the motor and a diagonal distance of the terminal screen; obtaining a distance between the event coordinates and an origin of the screen coordinates system; and according to the maximum vibration intensity of the motor, the diagonal distance of the terminal screen, and the distance between the event coordinates and the origin of the screen coordinates system, calculating the motor vibration intensity at the event coordinates of the vibration event.

In one embodiment, before controlling the motor corresponding to the target motor identifier to vibrate, the method further includes matching the event coordinates with a corresponding vibration effect in a vibration effect library. Controlling the motor corresponding to the target motor identifier to vibrate includes controlling the motor corresponding to the target motor identifier to vibrate with the vibration effect.

In another independent aspect, a vibration apparatus for a game controller includes an acquiring module configured to acquire current scene information on a terminal screen, the acquiring module further configured to, when the current scene information contains a vibration event, acquire event coordinates corresponding to the vibration event; a determining module configured to determine a target motor identifier according to the event coordinates; and a control module configured to control a motor corresponding to the target motor identifier to vibrate.

In another independent aspect, a game controller is provided which includes the vibration apparatus as described above.

In another independent aspect, a terminal device is provided which includes a processor; a memory in communication with the processor; and a computer program stored in the memory and executable by the processor. The processor, when executes the computer program, implements the vibration method for a game controller as described above.

In another independent aspect, a computer-readable storage medium is provided which has a computer program stored thereon. The computer program is executable by a processor to implement the vibration method for a game controller as described above.

In summary, the disclosure provides a game controller, a vibration method and a vibration apparatus for the game controller, a terminal device, and a computer-readable storage medium. The vibration method includes the following steps: acquiring current scene information on a terminal screen; when the current scene information contains a vibration event, acquiring event coordinates corresponding to the vibration event; determining a target motor identifier according to the event coordinates; and controlling a motor corresponding to the target motor identifier to vibrate. Different target motor identifiers correspond to different motors on the game controller, and are determined according to different event coordinates, so that different motors on the game controller can be controlled to vibrate according to the event coordinates of vibration events, and haptic-based information transmission is realized according to the vibration status of different motors on the game controller. In this way, the players can obtain game scene information according to vibration sensations, and make quick and accurate judgments and responses accordingly, so that the game controller not only serves as an input device for game control, but it also serves as an output device for feeding back game information to the players, thus improving the gaming experience for the players.

Independent features and/or independent advantages of this disclosure may become apparent to those skilled in the art upon review of the detailed description, claims and drawings.

DESCRIPTION OF THE EMBODIMENTS

The present disclosure will be described further below with reference to the accompanying drawings and embodiments.

Figure 1:
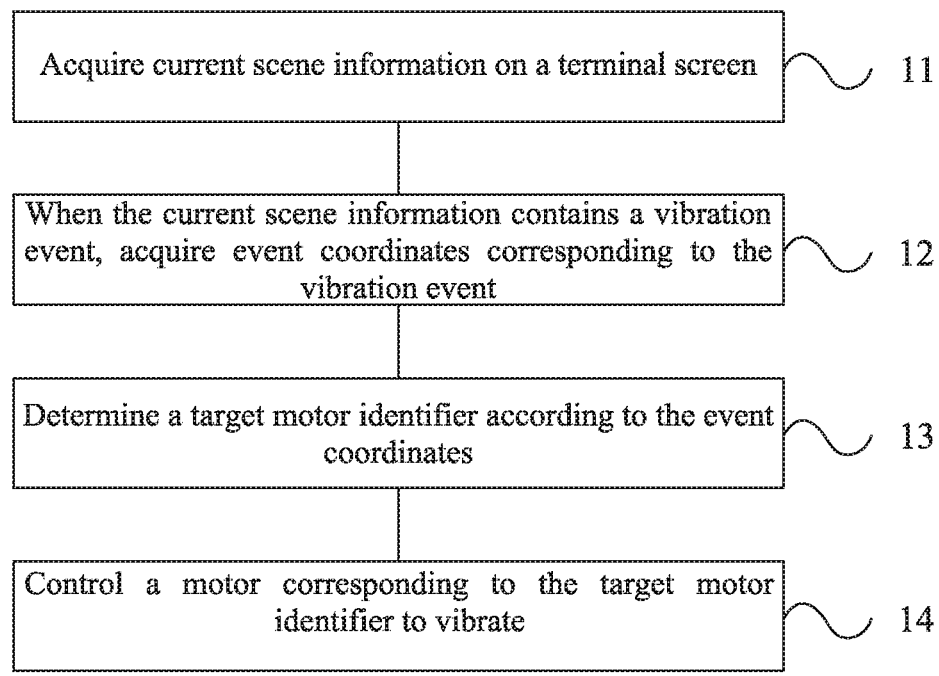
FIG. 1 is a flow chart of a vibration method for a game controller according to a first embodiment of the present disclosure.

FIG. 1 is a flow chart of a vibration method for a game controller according to a first embodiment of the present disclosure. As shown in FIG. 1, the vibration method for the game controller of the present embodiment includes the following steps.

At Step 11, current scene information on a terminal screen is acquired.

Game controllers are a common part for electronic game players, which can be used to control virtual characters in a game by manipulating buttons on the game controller. A standard configuration for the common game controllers is established and realized by Nintendo, which includes three types of buttons: a cross button (for direction), ABXY buttons (for action-some hardware manufacturers use other marking methods, but the arrangement is basically the same), and select and pause buttons (for menu). With the upgrade of hardware of game equipment, some game controllers are equipped with analog sticks (for direction and viewing angle) and trigger and HOME buttons. The vibration method for a game controller disclosed herein has no limit on the type, number and arrangement of buttons on the game controller.

For playing a game, a player connects the game controller to a terminal (such as a computer, a television or a smart terminal), the current scene information of the game is presented on a terminal screen, and the player manipulates the buttons on the game controller to control the display of game pictures and virtual characters in the game.

The present embodiment is realized by means of a vibration apparatus for the game controller. During a game, the vibration apparatus for the game controller acquires the current scene information on the terminal screen. The current scene information may include various kinds of information such as picture information and/or sound information.

At Step 12, when the current scene information contains a vibration event, event coordinates corresponding to the vibration event are acquired.

The vibration apparatus for the game controller extracts the event coordinates corresponding to the vibration event from the acquired current scene information, which specifically includes the following steps.

At step S121, the vibration apparatus extracts all events contained in the current scene information.

All operations performed by the player in the game through the game controller are extracted. All effective operations in the game are defined as events. For example, to move a character leftwards, the player presses the left-moving button on the game controller, and then the virtual character in the current scene moves leftwards.

At step S122, an event which meets preset trigger conditions is selected from all the events, and the event that meets the preset trigger conditions is determined to be a vibration event.

The operations performed by the player include various events. Some events contain game information, which requires feedback of a result to the player. For some other events which contain merely general operation information, there is no need to provide feedback to the player. Moreover, if a motor vibrates every time the player conducts an operation, the user would not be able to know the current scene information according to the haptic sensation. Therefore, it is necessary to filter all the extracted events and control the motor to vibrate only when game information needs to be fed back to the player, so that the user can know the current scene information of the game according to a vibration sensation.

The events can be filtered according to the preset trigger conditions. The preset trigger conditions can be preset at factory, or can be set by the player before the game starts.

All the events are screened to identify an event that meets the preset trigger conditions, and the identified event is determined to be the vibration event. When a vibration event occurs in the current scene information, a motor on the game controller that corresponds to the vibration event vibrates, and the player can know the game feedback information through the vibration sensation.

At step S123, event coordinates of the vibration event in a screen coordinates system is acquired.

A plane rectangular coordinates system is established in the terminal screen, for example, a coordinates system of the screen is established with the point in the lower right corner of the terminal screen as the origin, or with the central point of the terminal screen as the origin. Generally, the terminal screen is axisymmetric, upper and lower portions of the screen are symmetrical with respect to a horizontal center line passing through the central point, and left and right portions of the screen are symmetrical with respect to a vertical center line passing through the central point. For ease of calculation, the plane rectangular coordinates system established with the central point of the terminal screen as its origin is preferably used as the screen coordinates system in the present embodiment.

After the screen coordinates system is determined, the event coordinates of the vibration event in the screen coordinates system are obtained, that is, a location of the event triggering the vibration of the motor is obtained.

At Step 13, a target motor identifier is determined according to the event coordinates.

When the game controller includes only one motor, a vibration event at any location on the screen can trigger the motor to vibrate, which makes the user unable to know the location of the vibration event according to the vibration sensation, and hence unable to make quick and accurate judgments and responses. Therefore, in the present embodiment, there are at least two motors in the game controller. After the event coordinates are determined, it is necessary to further determine which motor is triggered by the event coordinates to vibrate. In the present embodiment, the motor corresponding to the event coordinates is determined by the target motor identifier. Determining the target motor identifier according to the event coordinates specifically includes the following steps.

At step S131, a target area of the vibration event in the screen coordinates system is determined according to the event coordinates.

According to the number of the motors and the positions of all the motors in the game controller, the terminal screen is divided into several areas, the number of which is equal to the number of the motors. Therefore, the relationships between the divided areas and the motors are determined, with each area in the screen correlates to a corresponding motor identifier. According to the divided areas, the area where the event coordinates are located is determined as the target area.

At step S132, a target motor identifier corresponding to the target area is determined according to the predetermined relationships between the areas and the motor identifiers.

After the target area is determined, the target motor identifier corresponding to the target area is determined according to the preset relationships.

For example, assuming that the game controller has four motors, the identifiers of which are motor A, motor B, motor C and motor D, respectively, and the four motors are located at four corners of the game controller. According to the number and positions of the motors, the terminal screen is divided into four areas: a first area, a second area, a third area and a fourth area, wherein the first area corresponds to the motor A, the second area corresponds to the motor B, the third area corresponds to the motor C and the fourth area corresponds to the motor D. If the event coordinates of the vibration event are located in the first area, it is determined that the target motor identifier corresponding to the first area is the motor A.

Optionally, the areas and the motor identifiers can be in one-to-one correspondence. For example, when the event coordinates of the vibration event are located in the first area, it is determined that the target motor identifier corresponding to the first area is the motor A. It is also possible that one area corresponds to multiple motor identifiers. For example, when the event coordinates of the vibration event are located in the first area and the target motor identifiers corresponding to the first area are the motor A and the motor B, then the target motor identifiers are determined to be the motor A and the motor B.

Optionally, the divided areas can be tangent to one another (having a coincident line), partially overlapped (having a coincident plane) or separated from each other (non-coincident). When the event coordinates of the vibration event are located on the coincident line or coincident plane, the motor identifiers corresponding to the two areas are both determined as the target motor identifiers. When the event coordinates of the vibration event are only located in one area, the motor identifier corresponding to this area is determined as the target motor identifier. When the event coordinates of the vibration event are not in any of the divided areas, it is determined that there is no motor identifier corresponding to this area, and in this case, it can be set that no motor vibrates or all motors vibrate. The relationships between the areas and the motor identifiers can be set by the player according to operation habits, as long as there is at least one area corresponding to each motor identifier.

At Step 14, the motor corresponding to the target motor identifier is controlled to vibrate.

The vibration apparatus for the game controller controls the motor corresponding to the target motor identifier to vibrate.

Since each motor necessarily corresponds to at least one area, the player can judge which motor of the game controller is vibrating according to the haptic sensation, and determine that a vibration event is occurring in the area corresponding to the vibrating motor according to the preset relationships between the motors and the areas. As such, the player can know the area of the vibration event on the screen even without looking at the terminal screen, thus realizing haptic-based information transmission according to the vibration conditions of different motors on the game controller, so that the player can obtain the game scene information according to the vibration sensations and accurately position the game scenes. Therefore, during gaming, the player can keep up with the game progress in real time and make accurate responses accordingly. According to the vibration method for the game controller disclosed herein, the game controller not only serves as an input device for game control, but it also serves as an output device for feeding back the game information to the player, thus improving the gaming experience for the player.

The vibration method for the game controller according to the present embodiment includes: acquiring current scene information in a terminal screen; when the current scene information contains a vibration event, acquiring event coordinates corresponding to the vibration event; determining a target motor identifier according to the event coordinates; and controlling a motor corresponding to the target motor identifier to vibrate. Different target motor identifiers correspond to different motors on the game controller, and are determined according to different event coordinates, so that different motors on the game controller can be controlled to vibrate according to the event coordinates of vibration events, and haptic-based information transmission is realized according to the vibration status of different motors on the game controller. In this way, the player can obtain game scene information according to the vibration sensation, and make quick and accurate judgments and responses accordingly, so that the game controller not only serves as an input device for game control, but it also serves as an output device for feeding back game information to the players, thus improving the gaming experience for the player.

Figure 2:
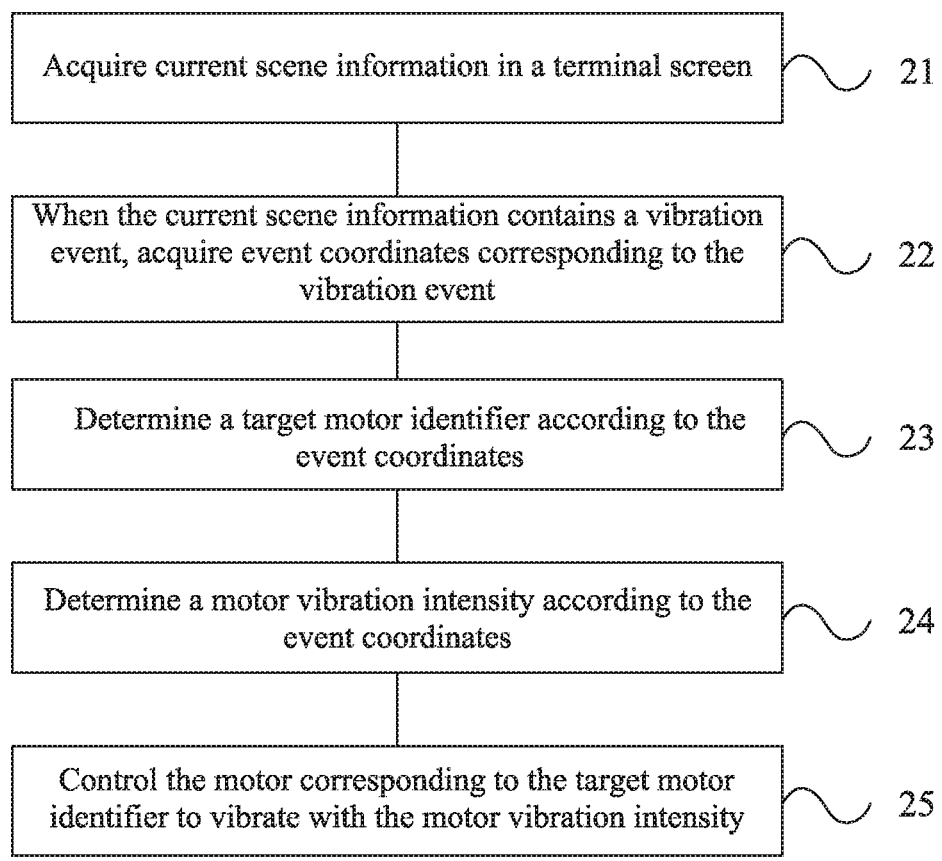
FIG. 2 is a flow chart of a vibration method for a game controller according to a second embodiment of the present disclosure.

FIG. 2 is a flow chart of another vibration method for a game controller according to a second embodiment of the present disclosure, and implementation of the second embodiment is based on the first embodiment. As shown in FIG. 2, the vibration method for the game controller according to the present embodiment includes the following steps.

At Step 21, current scene information on a terminal screen is acquired.

At Step 22, when the current scene information contains a vibration event, event coordinates corresponding to the vibration event are acquired.

At Step 23, a target motor identifier is determined according to the event coordinates.

The above steps 21 to 23 correspond to steps 11 to 13 in the first embodiment. For further details of steps 21 to 23, please refer to the corresponding explanations in steps 11 to 13 in the first embodiment, which are not repeated herein.

The present embodiment further takes vibration intensity into consideration on the basis of the first embodiment, and vibration events with different event coordinates are set to have different vibration intensities. The specific steps are as follows:

At Step 24, the vibration intensity of the motor is determined according to the event coordinates.

In order to obtain the current game scene information more accurately, vibration events at different locations are described with an additional parameter: vibration intensity.

It is predetermined that the vibration intensity at the central point of the terminal screen is the largest, the farther away from the central point, the smaller the vibration intensity, and the vibration intensity is zero at the four corners of the terminal screen. Determining the vibration intensity of the motor according to the event coordinates specifically includes the following steps.

At step S241, a maximum vibration intensity of the motor and a diagonal distance of the terminal screen are obtained.

The maximum vibration intensity of the motor is determined according to the model of the motor, and the maximum vibration intensity is defined as the vibration intensity when the event coordinates of the vibration event are at the central point of the screen (i.e. the origin of the screen coordinates system).

The distance between the event coordinates of the vibration event and the origin can be calculated by the obtained diagonal distance of the terminal screen. In practical application, the distance between the event coordinates of the vibration event and the origin can also be calculated by obtaining the length and height of the terminal screen, or by other means. Therefore, the means of obtaining the distance between the event coordinates of the vibration event and the origin described herein are illustrative rather than restrictive.

At step S242, the distance between the event coordinates and the origin of the screen coordinates system is obtained.

According to the event coordinates and distance calculation formula, the distance between the event coordinates of the vibration event and the origin of screen coordinates system is calculated.

At step S243, according to the maximum vibration intensity of the motor, the diagonal distance of the terminal screen, and the distance between the event coordinates and the origin of the screen coordinates system, the motor vibration intensity at the event coordinates of the vibration event is calculated.

Assuming that the maximum vibration intensity of the motor is $V_{max}$, the diagonal distance of the terminal screen is $P_{max}$, the event coordinates of the vibration event are (x, y), and the distance between the event coordinates and the origin is $d=\sqrt{x^2+y^2}$, according to the proportional relationship between the maximum vibration intensity of the motor, the vibration intensity of the motor at the event coordinates of the vibration event, the diagonal distance of the terminal screen, and the distance between the event coordinates and the origin of the screen coordinates system, the calculation formula of the motor vibration intensity v at the event coordinates of the vibration event is as shown in Formula (1):

$$v = \left(1 - \frac{2d}{P_{max}}\right) \times V_{max} \tag{1}$$

It is only one way to determine the motor vibration intensity at the event coordinates of the vibration event by assuming that the vibration intensity at the center of the screen is the largest, the farther away from the center of the screen, the smaller the vibration intensity, and the vibration intensity is zero at the four corners of the terminal screen. It is also possible to determine the motor vibration intensity at the event coordinates of the vibration event by assuming that the vibration intensity at the center of the screen is the smallest, the farther away from the center of the screen, the larger the vibration intensity, and the vibration intensity is the largest at the four corners of the terminal screen. It is also possible to determine the motor vibration intensity at the event coordinates of the vibration event by assuming that the central position of each area has the largest vibration intensity, and the farther away from the central position, the smaller the vibration intensity in each area. The specific vibration mode can be set by the player or preset at factory, which is not limited to any particular mode in the present embodiment.

At Step 25, the motor corresponding to the target motor identifier is controlled to vibrate with the calculated motor vibration intensity.

The vibration apparatus for the game controller controls the motor corresponding to the target motor identifier to vibrate with the determined vibration intensity. The player can know the area of the vibration event on the screen according to the haptic sensation and know the distance from the origin according to the vibration intensity, which makes it possible to make faster and more accurate judgments and responses, thus improving the gaming experience for the player.

Figure 3:
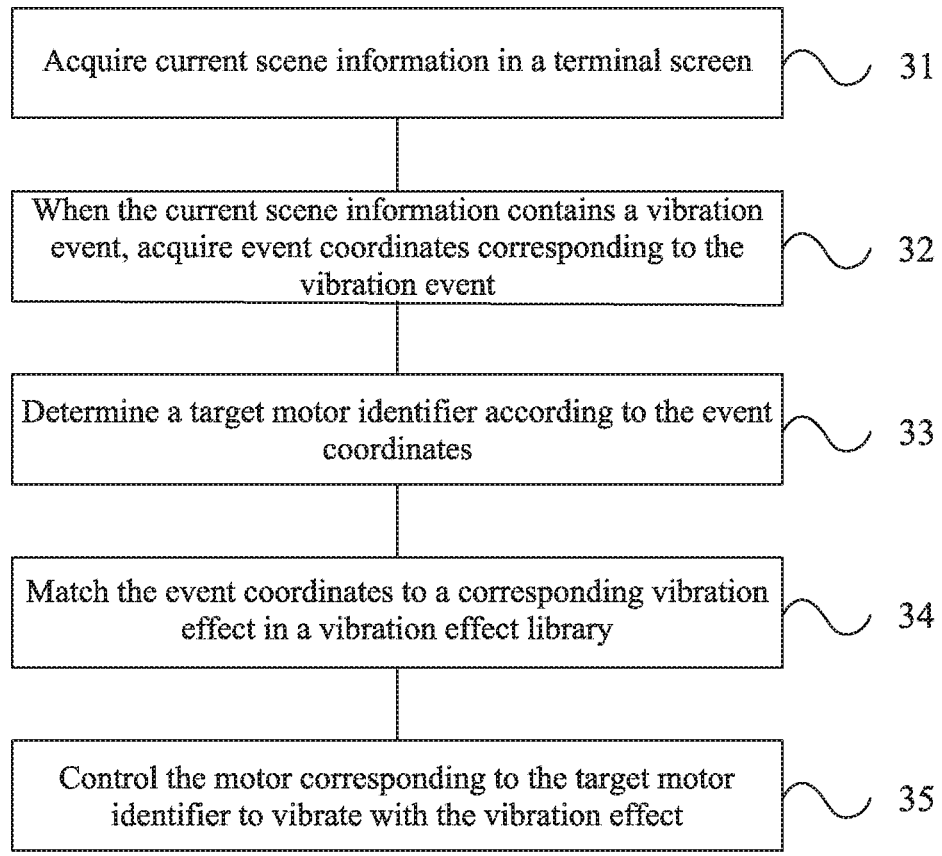
FIG. 3 is a flow chart of a vibration method for a game controller according to a third embodiment of the present disclosure.

FIG. 3 is a flow chart of still another vibration method for a game controller according to a third embodiment of the present disclosure, and implementation of the third embodiment is based on first and second embodiments. As shown in FIG. 3, taking the implementation of the third embodiment based on the first embodiment as an example, the vibration method for the game controller according to the present embodiment includes the following steps.

At Step 31, current scene information on a terminal screen is acquired.

At Step 32, when the current scene information contains a vibration event, event coordinates corresponding to the vibration event are acquired.

At Step 33, a target motor identifier according to the event coordinates is determined.

The above steps 31 to 33 correspond to steps 11 to 13 in the first embodiment. For details of steps 31 to 33, please refer to the corresponding explanations in steps 11 to 13 in the first embodiment, which are not repeated here.

The present embodiment further takes vibration effect into consideration on the basis of the first embodiment, and vibration events with different event coordinates are set to have different vibration effects. The specific steps are as follows:

At Step 34, the vibration event is matched with a corresponding vibration effect in a vibration effect library according to the event coordinates of the vibration event.

Vibration events are matched with different vibration effects according to a predefined vibration effect library. Specifically, vibration events are matched with different vibration effects according to the event coordinates of the vibration events. For example, when the event coordinates are at the origin of the screen coordinates system, the vibration effect is set to be continuous vibration for 3 seconds; when the event coordinates are at a certain coordinates point in the first area, the vibration effect is set to be three-long and two-short vibration for 3 seconds; and when the event coordinates are at edges other than the four corners of the screen, the vibration effect is set to be cyclic vibration for 3 seconds in which the motor vibrates for 0.5 seconds, and then pauses for 0.5 seconds in a cyclic manner. The specific vibration effects can be set by the player or preset at factory, which is not intended to be limited to any particular pattern in the present embodiment.

Step 35, the motor corresponding to the target motor identifier is controlled to vibrate with the determined vibration effect.

The vibration apparatus for the game controller controls the motor corresponding to the target motor identifier to vibrate with the matched vibration effect, which enriches the haptic sensations the player gets from the game controller and increases the acquired information amount of the current game scene, so that the player can make faster and more accurate judgments and responses and hence the gaming experience is improved for the player.

Figure 4:
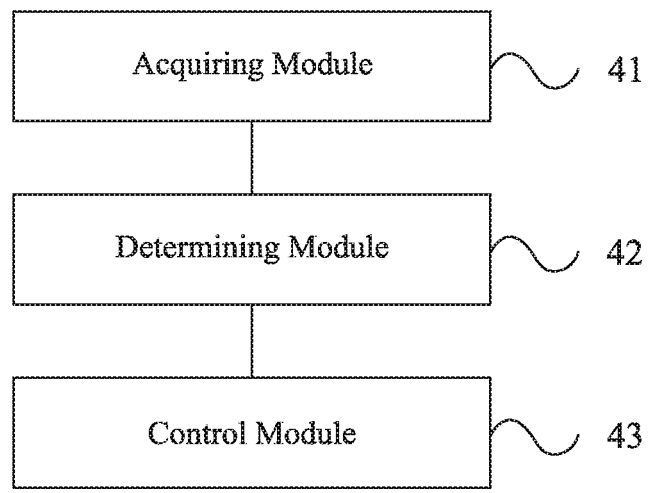
FIG. 4 is a block diagram illustrating a vibration apparatus for a game controller according to a fourth embodiment of the present disclosure.

FIG. 4 is a block diagram illustrating a vibration apparatus for a game controller according to a fourth embodiment of the present disclosure. As shown in FIG. 4, the vibration apparatus for the game controller according to the present embodiment includes an acquiring module 41, a determining module 42, and a control module 43.

The acquiring module 41 is configured to acquire current scene information on a terminal screen.

The acquiring module 41 is further configured to, when the current scene information contains a vibration event, acquire event coordinates corresponding to the vibration event.

The determining module 42 is configured to determine a target motor identifier according to the event coordinates.

The control module 43 is configured to control a motor corresponding to the target motor identifier to vibrate.

The vibration apparatus for the game controller according to the fourth embodiment is used to realize the vibration method for the game controller described in the first embodiment, and the functions of each module can be understood by referring to the corresponding description in the method embodiment since they have similar implementation principles and produce similar technical results, which are therefore not repeated here.

Figure 5:
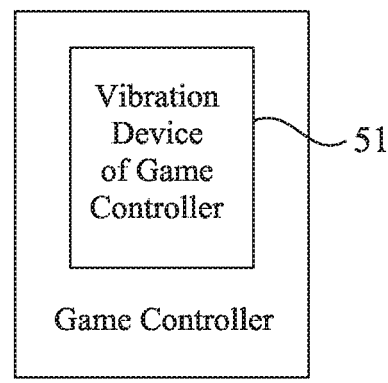
FIG. 5 is a block diagram illustrating a game controller according to a fifth embodiment of the present disclosure.

FIG. 5 is a block diagram illustrating a game controller according to a fifth embodiment of the present disclosure. As shown in FIG. 5, the game controller of the present embodiment includes a vibration apparatus 51 for the game controller. The vibration apparatus 51 can be the same as the vibration apparatus of the fourth embodiment shown in FIG. 4. The player can determine the information represented by the vibration information of the game controller based on the haptic sensation, thus realizing haptic-based information transmission according to the vibration status of different motors in the game controller. The player can thus obtain the game scene information according to the vibration sensations and accurately position game scenes. During gaming, the player can keep up with the game progress in real time and make accurate responses accordingly. The game controller of the present embodiment not only serves as an input device for game control, but it also serves as an output device for feeding back game information to the player, thus improving the gaming experience for the player.

Figure 6:
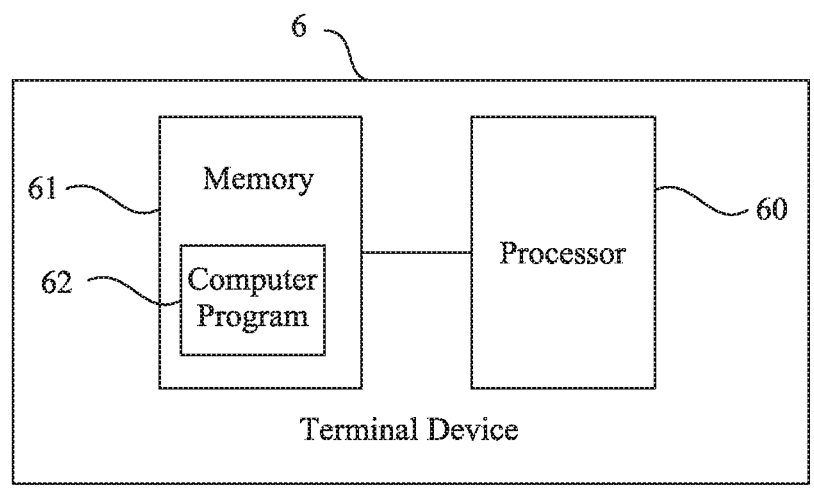
FIG. 6 is a block diagram illustrating a mobile terminal according to a sixth embodiment of the present disclosure.

FIG. 6 is a block diagram illustrating a mobile terminal according to a sixth embodiment of the present disclosure. As shown in FIG. 6, the terminal equipment 6 of the present embodiment includes a processor 60, a memory 61 in communication with the processor 60, and a computer program 62 stored in the memory 61 and executable by the processor 60. The computer program 62 is, for example, a vibration program for the game controller. When the processor 60 executes the computer program 62, the steps of the vibration methods for the game controller in the above embodiments, such as steps 11 to 14 shown in FIG. 1, are realized. In addition or alternatively, when the processor 60 executes the computer program 62, the functions of each module in the above apparatus embodiments, such as the functions of the modules 41 to 43 shown in FIG. 4, are realized.

Just as an example, the computer program 62 can be divided into one or more modules/units, and the one or more modules/units are stored in the memory 61 and executed by the processor 60 to realize the method disclosed herein. The one or more modules/units can be a series of computer program instruction segments capable of completing specific functions. The instruction segments are used to describe the implementation process of the computer program 62 in the terminal device 6. For example, the computer program 62 can be divided into an acquiring module, a determining module, and a control module (unit modules in a virtual device), and the specific functions of each module are as follows.

The acquiring module is configured to acquire current scene information on a terminal screen. The acquiring module is further configured to, when the current scene information contains a vibration event, acquire event coordinates corresponding to the vibration event.

The determining module is configured to determine a target motor identifier according to the event coordinates.

The control module is configured to control a motor corresponding to the target motor identifier to vibrate.

The terminal device 6 can be a computing device such as a desktop computer, a notebook, a palm computer, or a cloud server. The terminal device 6 can include, among others, the processor 60 and the memory 61. Those skilled in the art can understand that the terminal device shown FIG. 6 is illustrative rather than restrictive. The terminal device can include more or less parts than those in the figure, or a combination of some parts, or have different parts. For example, the terminal device 6 can also include some input and output units, network access units, buses, etc.

The processor 60 can be a central processing unit (CPU), or another type of general processor, a digital signal processor (DSP), an application specific integrated circuit (ASIC), a field-programmable gate array (FPGA) or another programmable logistic unit, a discrete-gate or transistor logistic unit, a discrete hardware component, etc. The general processor can be a micro-processor or any conventional processor.

The memory 61 can be an internal storage unit of the terminal device 6, for example a hard disk drive or an internal memory of the terminal device 6. The memory 61 can also be an external storage unit of the terminal device 6, for example, a plug-in hard disk attached to the terminal device 6, a smart media card (SMC), a secure digital (SD) card, a flash card, etc. Further, the memory 61 can also include both the internal storage unit of the terminal device 6 and the external storage device. The memory 61 is used to store the computer program and other programs and data required by the terminal device 6. The memory 61 can also be used to temporarily store data that has been outputted or is to be outputted.

It can be clearly understood by those skilled in the art that for the convenience and conciseness of description, only the above division way of the functional units and modules is exemplified. In practical application, the above functions can be realized by different functional units and modules as required, that is, the internal structure of the terminal equipment is divided into different functional units or modules to complete all or part of the functions described above. The functional units and modules in the embodiments can be integrated in one processing unit, or each unit can exist physically alone, or two or more units can be integrated in one unit. The integrated units can be implemented in the form of hardware or software functional units. In addition, the specific names of the functional units and modules are only for distinguishing purpose, and are not used to limit the protection scope of the disclosure. The specific working processes of the units and modules in the above system can be understood by referring to the corresponding processes in the above method embodiments, and will not be described in detail here.

Those skilled in the art can clearly appreciate that, for convenient description and concision, the division of the functional units and modules described above are used for illustration only. In actual application, the functions mentioned above can be allocated to and conducted by different functional units and modules according to needs, meaning that the internal functional structure of the terminal device can be divided into different functional units and modules to conduct all or part of the functions described above. In these embodiments, various functional units and modules can be integrated into one processing unit, or individually and physically exist as individual units. Alternatively, two or more units can be integrated into one unit. The integrated units can be realized in not only hardware form, but also software form. In addition, the specific names of various functional units and modules are given for distinguishing purpose only, and shall not be regarded as restrictive. The specific working process of the system units and modules described above can be understood by referring to the corresponding processes of the method embodiments described above, and therefore is not described in detail herein.

In the above embodiments, the descriptions of each embodiment have their own emphasis. For those parts that are not detailed or described in a certain embodiment, please refer to the relevant descriptions of other embodiments.

Those skilled in the art can be aware of that the units and method steps of the examples described in conjunction with the embodiments can be performed by electronic hardware or a combination of computer software and electronic hardware. Whether the functions are conducted by hardware or software depends on the specific application and design restriction conditions of the technical solution. Those skilled in the art may adopt different methods to realize the described functions in specific applications, but such realization process shall not be regarded as going beyond the scope of the present disclosure.

It should be understood that the apparatuses/terminal devices and methods disclosed in the embodiments of the present disclosure can also be realized in other ways. For example, the embodiments of the apparatus/terminal device are merely illustrative. For instance, the division of the modules or units as described herein is merely an exemplary division of logical functions. Various other division methods can be adopted in actual application, for example, a plurality of units or components can be combined or integrated in another system, or some features can be omitted and are not implemented. Moreover, all illustrated or discussed indirect coupling, direct coupling or communication connection can be achieved by some interfaces, and the indirect coupling or communication connection can be electrical, mechanical or in other form.

The units described as separate parts can be or be not physically separate; the parts illustrated as units can be or be not physical units, i.e. they can be located at one place or distributed among a plurality of network units. Some or all of the units can be selected according to needs to achieve the objectives of the solutions of the embodiments.

In addition, in the embodiments of the present disclosure, various functional units can be integrated into one processing unit, or individually and physically exist as individual units; or two or more units are integrated into one unit. The integrated units can be achieved in not only hardware form, but also in software form.

If implemented in the form of software and sold and used as an independent product, the integrated modules/units can be stored on a computer-readable medium. Based on such understanding, all or some of the steps of the methods in the embodiments of the present disclosure can be implemented by hardware instructed by the computer program. The computer program can be stored on a computer-readable storage medium. The processor, which executing the computer program, can implement the steps of all methods disclosed in the embodiments. The computer program includes computer program codes that may be in the form of source codes, object codes, executable files or some intermediate codes. The computer-readable medium can include any physical device or apparatus capable of carrying the computer program codes, recording medium, USB flash disks, mobile hard disks, magnetic disks, optical disks, computer memories, read-only memory (ROM), random access memory (RAM), electric carrier signals, telecommunication signals, software distribution medium, etc.

It should be understood that the sequence numbers of the steps in the embodiments described above does not decide the implementation sequence, and the implementation sequence of each method depends on the functions and internal logic. Therefore, the sequence numbers of the steps shall not be construed as any limit to the implementation process of the embodiments of the present disclosure.

The features of the above embodiments can be combined in any suitable manner. For concise description, it is impossible to describe all possible combinations of the features of the above embodiments. However, as long as there is no contradiction in a combination of features of the present disclosure, that combination shall be considered as falling within the protective scope of the present disclosure.

Although the disclosure is described with reference to one or more embodiments, it will be apparent to those skilled in the art that various modifications and variations can be made to the disclosed structure and method without departing from the scope or spirit of the disclosure. In view of the foregoing, it is intended that the present disclosure cover modifications and variations of this invention provided they fall within the scope of the following claims and their equivalents.

What is claimed is:

1. A vibration method for a game controller, comprising:
   acquiring current scene information on a terminal screen;
   when the current scene information contains a vibration event, extracting all events contained in the current scene information;
   selecting an event which meets preset trigger conditions from all the events, and determining the event meeting the preset trigger conditions as the vibration event; and acquiring the event coordinates of the vibration event in a screen coordinates system;
   determining a target motor identifier according to the event coordinates;
   determining a motor vibration intensity according to the event coordinates and matching the event coordinates with a corresponding vibration effect in a vibration effect library; and
   controlling the motor corresponding to the target motor identifier to vibrate with the vibration effect and the determined motor vibration intensity.

2. The vibration method for the game controller according to claim 1, wherein determining the target motor identifier according to the event coordinates comprises:
   determining a target area of the vibration event in the screen coordinates system according to the event coordinates; and
   determining a target motor identifier corresponding to the target area according to preset relationships between areas and motor identifiers.

3. The vibration method for the game controller according to claim 1, wherein determining a motor vibration intensity according to the event coordinates comprises:
   obtaining a maximum vibration intensity of the motor and a diagonal distance of the terminal screen;
   obtaining a distance between the event coordinates and an origin of the screen coordinates system; and
   according to the maximum vibration intensity of the motor, the diagonal distance of the terminal screen, and the distance between the event coordinates and the origin of the screen coordinates system, calculating the motor vibration intensity at the event coordinates of the vibration event.

* * * * *